May 22, 1934. H. H. ROBINSON 1,960,196
GUSSET PLATE CONNECTION FOR TRUSS FRAMES
Filed April 2, 1932
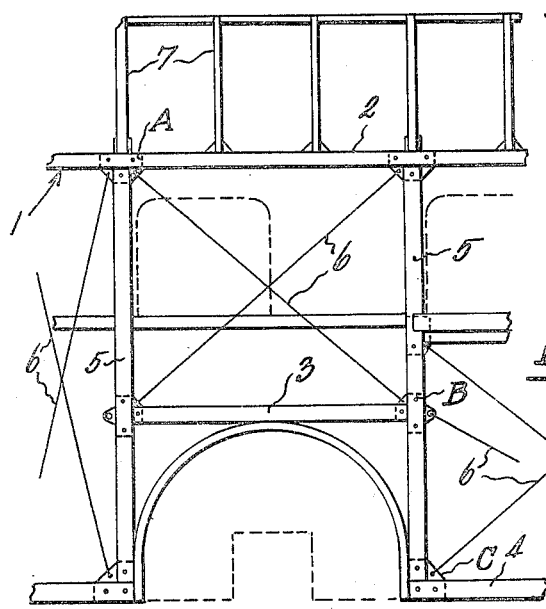
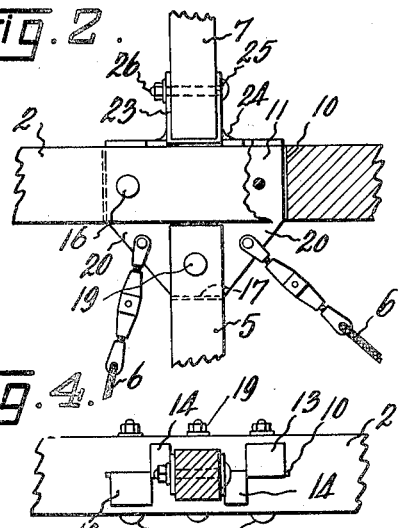
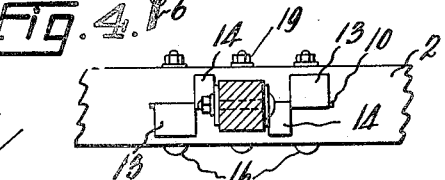
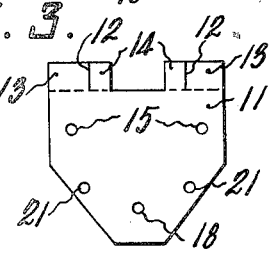
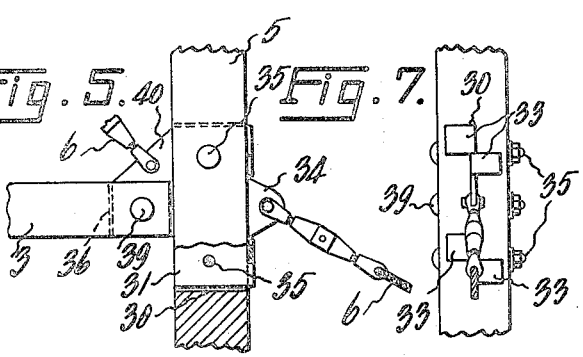
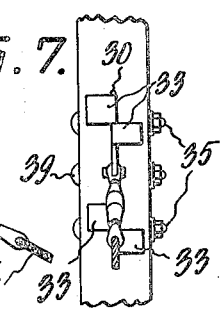
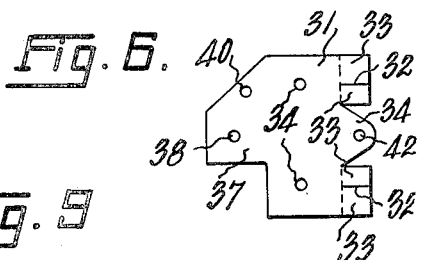
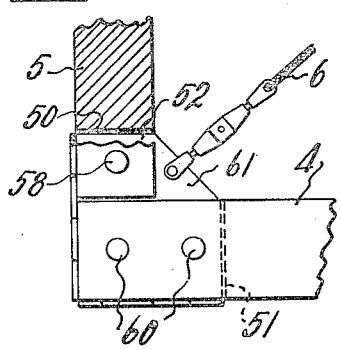
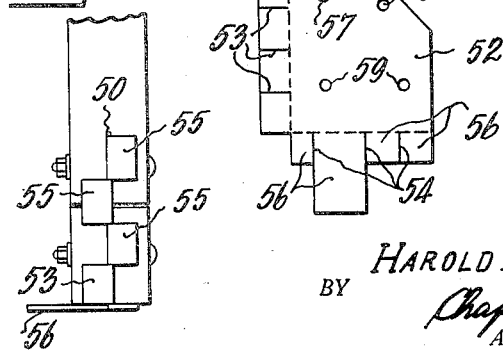
INVENTOR.
HAROLD H. ROBINSON
BY
Chapin & Neal
ATTORNEYS.

Patented May 22, 1934

1,960,196

UNITED STATES PATENT OFFICE 1,960,196

GUSSET PLATE CONNECTION FOR TRUSS FRAMES

Harold H. Robinson, Opa Locka, Fla., assignor to Curtiss Aerocar Company, Inc., Opa Locka, Fla., a corporation of Florida Application April 2, 1932, Serial No. 602,754

3 Claims. (Cl. 296—28)

This invention relates to means for connecting together members of a truss structure designed for use in a body frame for motor vehicles, trailers, railway coaches, aircraft, water craft, and the like, wherein the body is to be of extremely light weight and yet capable of sustaining load, draft and tortional stresses. The invention is illustrated in association with the well known Pratt type of truss construction embodying wooden chord and compression members and wire or metal rod tension members.

The principal objects of the invention are to secure greater strength and durability at the joints of the frame and at the same time a moderate degree of flexibility of the joints individually and of the frame as a whole without any weakening of the same, together with lightness of construction. Further objects and advantages are found in the greater facility of assembly, simplification of the frame members and decreased cost of construction. Other and more specific advantages will be apparent from the following specification and claims.

In the accompanying drawing which illustrates the application of the invention to various members of a trailer body frame, Fig. 1 is a side elevational view of a portion of a body frame embodying the invention;

Fig. 2 is a detail side view partly in section of the joint between the upper chord, a roof bow, a side post and tension members the location of which is indicated at A in Fig. 1;

Fig. 3 is a detail side view of the gusset plate element of the joint of Fig. 2 partially formed;

Fig. 4 is a top view of the structure shown in Fig. 2;

Fig. 5 is a detail side view partly in section of the joint between a post, intermediate chord and tension members the location of which is indicated at B in Fig. 1;

Fig. 6 is a side view of the gusset plate element of the joint shown in Fig. 5, partially formed;

Fig. 7 is a view of the structure shown in Fig. 5, looking from the right of said figure;

Fig. 8 is a detail side view partly in section of the joint between the lower chord, a post and a tension member the location of which is indicated at C in Fig. 1;

Fig. 9 is a similar view of the gusset plate element of the joint shown in Fig. 8 partially formed; and Fig. 10 is a view looking from the left in Fig. 8.

Referring to the drawing, 1 designates generally a body frame structure for a passenger coach or trailer, which includes an upper chord 2, an intermediate chord 3, a lower chord 4, vertical posts 5, tension members 6, and roof arches or bows 7. With the exception of tension members 6 which may be of wire or small metal rods, the frame members are formed of wood. The present invention relates to the manner in which the various members are joined together, irrespective of the design of the frame and it is therefore unnecessary to describe in detail the frame structure, as such, which is illustrated in the Fig. 1 of drawing. The invention as exemplified in joints A, B, and C of Fig. 1 will be described in detail below, with reference to Figs. 2 to 10 inclusive.

In Figs. 2, 3 and 4 is shown the manner of joining, as at A, a vertical post 5, tension members 6 and a roof bow 7 to the chord 2. As shown, chord 2 is cut with a longitudinal kerf 10 extending entirely through it and positioned midway between the sides of the cord. The kerf 10 is of a length to receive and of a transverse width to snugly fit the flat body portion of a gusset plate 11 which is preferably of metal. Plate 11 is formed by being blanked out in the shape shown in Fig. 3 and is then cut at its edge portion as at 12 to form wings 13 and 14 which are alternately bent in opposite directions as shown in Fig. 4. The wings are bent at such an angle to the body of the plate as to lie in flat engagement with the upper face of the chord when the plate is driven into the kerf 10. In the form shown in Fig. 4 the wings 13 and 14 are at right angles to the body of the plate. The plate 11 is provided with holes 15 through which two bolts 16 may be passed to secure the plate in the chord 2. The end of post 5 has cut through itself about midway of its sides a kerf 17, to receive the central portion of the plate 11 extending below the chord 2 and the plate is provided with an opening 18 through which is passed a bolt 19 to secure the plate in post 5. Kerf 17 is so positioned as to be in aligned communication with kerf 10 when the post and chord are in their desired end to face abutting relation as shown. As will be clear from Fig. 2 the shape of plate 11 provides exposed triangular webs 20 in the angles formed by chord 2 and post 5 and these webs have holes 21 in which the ends of wire tension members 6 are secured by any suitable means.

The roof bow 7 is secured to plate 11 by a metal U-shaped member 23 which is welded at its base, as indicated at 24, to the adjacent edges of the plate and wings 14. The upstanding sides of U-member 23 receive the end of bow 7 between them and are provided with aligned holes 25 through which a bolt 26 may be passed to secure the bow in place.

Figs. 5, 6, and 7 show the application of the principle of the invention to the joint B between a post 5, an intermediate chord 3 and tension members 6. As shown the post 5 is cut entirely through with a kerf 30 about midway of its sides to receive the gusset plate 31 which in its blanked out form is shown in Fig. 6. The blank is cut as at 32 to form the wings 33 which are alternately bent in opposite directions at right angles to the plate as best shown in Fig. 7. Intermediate the wings 33 is provided a rounded extension 34. The wings 33 flatly engage the face of the post 5 when the plate is driven into the kerf 30 as shown in Fig. 5. The plate 31 is provided with two holes 34 to receive bolts 35 which secure the plate to the post. The end of intermediate chord 3 is cut through with a kerf 36 to receive the portion 37 of the plate extending beyond the post and the plate is provided with a hole 38 to receive a bolt 39 by which the plate is held in the intermediate chord 3. As in the form previously described the kerfs 30 and 36 are positioned in communicating alignment and the plate 31 is formed to provide an exposed triangular web 40 in the angle of the chord 3 and post 5. Web 40 and extension 34 have holes 41 and 42 respectively for the attachment of tension wires 6.

Figs. 8, 9 and 10 show the application of the invention to the corner joint C between the lower chord 4, a post 5 and a tension member 6. As best shown in Fig. 8 the post 5 and the chord 4 are provided at their adjacent ends with respective aligned, communicating kerfs 50 and 51 to receive the gusset plate 52 which in blank form is shown in Fig. 9. This form of gusset is provided along two adjacent edge portions, with cuts 53 and 54 to form wings 55 and 56 which are alternately bent in opposite directions to flatly engage the outer faces of the post and chord respectively when the plate is driven into the kerfs 50 and 51 as shown in Fig. 8. As shown, one of the wings 56 may be made longer than the others to extend beyond the edge of the chord 4 and provide a stop rest for an adjacent member (not shown) of the frame or body. A bolt hole 57 is provided in the plate to receive the bolt 58 which holds the plate in post 5, and two holes 59 receive bolts 60 for securing the plate in the chord 4. The triangular web 61, formed by the portion of the plate exposed in the angle of the post and chord, is provided with a hole 62 for attachment of tension member 6.

The above detailed description of the joints at A, B, and C will be sufficient to illustrate the adaptability of the invention to the wide range of conditions and requirements to be met in connecting the members of frame structures of this type. It will be seen that the joints are flexible to a degree, avoiding the brittleness of mortise and tenon or dove-tail joints, and permitting the frame as a whole to undergo the torsional and twisting strains to which this type of body construction is subjected without splitting or breaking or pulling away at the joints. The tension members are connected directly to the gusset plates and the plates by their wing engagement with the wooden members transmit the tensional strains as compression strains to said wooden members. The adaptation of the gusset plates as inserts rather than enveloping members for the wooden joints simplifies their design and in association with the truss connections relieves the fastening bolts of substantially all pulling or pushing strains. These fastening bolts merely serve to tie the parts together and thus avoid any tendency to split the wooden members or work loose therein. It will be observed that the bolt fastenings are in a two to one relation at each joint, that is the gusset plate is fastened to one wooden member by two bolts and to its joined wooden member by a single bolt. The single bolt fastening for the joined wooden member makes possible a limited hinge action for the latter which being opposed by the tension and compression forces of the truss structure gives the desired flexibility to the frame as a whole.

Since, by the use of the invention, the abutting ends of the wooden members may be simply cut square, the work of constructing the members is simplified and the assembly of the members requires merely the drilling of holes in the wooden members and the bolting of the gusset plates in place. Replacement of a wooden member is easily accomplished by first withdrawing the retaining bolts and disconnecting the tension member or members and then withdrawing the plate, when the wooden member can be removed sidewise from the truss.

What I claim is:

1. In a body frame formed as a truss adapted to sustain load, draft, and torsional strains and including wooden chord and post members, roof bows and metal tension members, said chord members and roof bows being positioned with their ends in abutting relation to opposite faces of the chord members intermediate the ends of the latter, means for holding said post members, roof bows and tension members to the chord members which comprises, aligned communicating saw kerfs formed in the abutting portions of the chord and post members, a gusset plate having a portion positioned in each of said kerfs and having portions extending exteriorly of said kerfs to form exposed web portions in the angles formed by the chord and post members to form points of attachment for the tension members, a plurality of wing members formed along one edge of said plate and engaging that face of the chord members opposite the adjacent post member and a U-shaped metal member secured at its base to said wing members and a single bolt securing the end of the adjacent roof bow between the arms of said U-shaped member, at least two bolts fastening said gusset plate to the chord member and a single bolt fastening said gusset plate to the post member.

2. In a body frame formed as a truss adapted to sustain load, draft, and torsional strains and including wooden chord and post members and wire tension members, said chord and post members being positioned in abutting end to face relationship, means connecting the post members to the chord members which comprises a single longitudinally positioned saw kerf formed in the chord member and passing therethrough, a saw kerf formed in the end of the post member abutting the chord member, said last named kerf being aligned with and in communication with the kerf formed in the chord member, a gusset plate having a portion positioned in each of said kerfs and having portions extending exteriorly of said kerfs to present exposed web portions in the angles formed by the chord and post members to provide points of attachment for the wire tension members, and a plurality of wing members formed along one edge of said plate and bent at right angles thereto to engage that face of the chord member opposite the abutting post member.

3. In a body frame formed as a truss adapted to sustain load, draft, and torsional strains and including wooden chord and post members and wire tension members, said chord and post members being positioned in abutting end to face relationship, means connecting the post members to the chord members which comprises a single longitudinally positioned saw kerf formed in the chord member and passing therethrough, a saw kerf formed in the end of the post member abutting the chord member, said last named kerf being aligned with and in communication with the kerf formed in the chord member, a gusset plate having a portion positioned in each of said kerfs and having portions extending exteriorly of said kerfs to present exposed web portions in the angles formed by the chord and post members to provide points of attachment for the wire tension members, a plurality of wing members formed along one edge of said plate and bent at right angles thereto to engage that face of the chord member opposite the abutting post member, at least two bolts holding said plate to one of said wooden members and a single bolt holding said plate to the other wooden member.

HAROLD H. ROBINSON.